United States Patent Office 3,149,024
Patented Sept. 15, 1964

3,149,024
ABRASIVE PAPER FILLED WITH PELLETS OF SPRAY DRIED SILICEOUS PIGMENTS
Prescott Behn, Bedford, and Alvin C. Whitaker, Needham, Mass., assignors, by mesne assignments, to J. M. Huber Corporation, Locust, N.J., a corporation of New Jersey
No Drawing. Filed Mar. 26, 1962, Ser. No. 182,642
20 Claims. (Cl. 162—181)

This invention relates to a novel form of pigment loaded paper. Specifically, this invention relates to sorbent, abrasive, pebble surfaced papers and the method of their production.

These unique papers are produced by loading paper pulp with an unmilled spray-dried siliceous paper pigment.

The roughness, abrasiveness and sorbency qualities of the papers of this invention are attributable to the unique characteristics of the siliceous pigment used as the filler. The filler also imparts to the paper the unusual property of uniformity of surface on both the wire and felt sides. Normally in filler applications the wire and felt sides of the paper are quite different. However, by the use of the spray dried siliceous paper pigment according to this invention, there is unexpectedly produced, a paper with both the wire and felt sides containing the same amount of pigment which are equally abrasive and rough to the touch.

It is these unique characteristics which enable the papers of this invention to be useful in a variety of applications. For example, the novel, sorbent, abrasive, pebble-surfaced papers are useful as rough surfaced art papers which are utilized in drawing, charcoal sketching or water color painting. The papers of this invention are, because of their abrasiveness, effective as a kitchen-aid scouring or polishing paper. These papers are also useful where adsorbent or absorbent papers are required.

In order to produce the desired pebble-surfaced effect on both the wire and felt sides of the paper, the filler pigment must be of such a character that the surfaces of the paper are permanent and are not smoothed by use. To cause this effect the spray dried pigment must be in the pellet form resulting from the drying and the pellets must contain an inner reinforcing structure which enables them to maintain their shape in the finished sheet.

It is an object of this invention to provide a permanently abrasive pigmented paper with no surface difference between the wire and felt sides.

It is another object of this invention to provide rough surfaced paper useful for drawing, charcoal sketching or water color painting.

A further object of this invention is to provide an abrasive paper useful as a kitchen-aid scouring and polishing paper.

These and other objects and advantages will be apparent from the following specification.

The pigments used to impart the unusual properties of abrasiveness, sorptiveness and pebble-surface to paper are siliceous pigments in the form of porous, difficultly friable pellets with an inner reinforcing structure formed by drying the pigment in a conventional spray dryer.

Only those siliceous pigments which exhibit thixotropic properties can be satisfactorily dried to form the fillers useful in this invention. These pigments are those produced by the reaction of mineral acids or soluble aluminum salts of those acids and alkali metal or alkaline earth metal silicates resulting in alkali metal alumino silicates, alkaline earth metal alumino silicates, silicic acid and alkaline earth silicates.

We have discovered that the peculiarly distinctive structure of the pellets of spray-dried sodium alumino silicate pigments is advantageously useful in the practice of this invention.

The particular group of sodium alumino silicate pigments which we have found to be advantageously adaptable to this invenion are fine, white, powdery materials of submicron particle size. Because of the particular rheological properties of, for example, filter cakes of these pigments, they can be easily atomized in a spray dryer nozzle and dried by the action of hot gases to produce porous, difficultly friable pellets with an inner reinforcing structure. These pellets have generally, a screen size distribution which varies according to the conditions of drying. For example, the temperature, viscosity of the feed and wheel speed are important factors in determining the pellet size and screen size distribution.

The usual operating conditions for a conventional spray dryer with a 26 foot diameter are: Inlet temperature, about 600°–1100° F.; outlet temperature, about 310°–190° F.; rate of feed, about 32,000 lbs./hr.; water evaporation rate, about 22,000 lbs./hr. and the speed of the wheel is about 6,000 to 19,000 r.p.m. Operating under these conditions the pellets produced exhibited the following pellet size distribution; about 20% to 40% finer than 200 mesh and about 5% to 30% finer than 325 mesh.

Sodium alumino silicate pigments are produced according to the disclosures of U.S. Patents 2,739,073 and 2,848,346 as well as copending applications Serial No. 107,090, filed May 2, 1961, and Serial No. 112,230, filed May 24, 1961. By the methods disclosed, the sodium alumino silicate pigments are prepared by suitably commingling and reacting together at low concentrations, aqueous solutions of an alkali metal silicate and a water-soluble aluminum salt such as aluminum sulfate, aluminum chloride, aluminum nitrate or ammonium alum. The resulting product is separated from the mother liquor by conventional means such as filtering, centrifuging or the like. The product which still contains moisture is thixotropic and can be converted to a fluid consistency by the application of force such as stirring, shaking, tapping, ultrasonic sound waves or the like. This fluid is then atomized in a spray nozzle and dried by the action of hot gases. The resulting pellet is porous, difficultly friable and contains an inner reinforcing structure. This inner reinforcing structure differentiates the pellets produced by spray drying sodium alumino silicate pigments from other closely related pigments. The usual form of pigment pellets produced by spray drying is a hollow sphere which is very friable, and contains no inner reinforcing structure.

By varying the reaction conditions under which the sodium alumino silicate pigments are produced, it is possible to control the molar ratios of the oxides of sodium, aluminum and silicon. Pigments with molar ratios of about 0.75 mole of $Na_2O$ per mole of $Al_2O_3$ and over about 4 moles of $SiO_2$ per mole of $Na_2O$ and a specific gravity of 2.10 to 2.26 are useful in the practice of this invention. Other siliceous pigments containing at least 50% $SiO_2$ are also useful.

The pigments we prefer to use in practicing this invention are those with molar ratios of about 0.75 to 1.3 moles of $Na_2O$ per mole $Al_2O_3$ and about 4 to 22 moles of $SiO_2$ per mole of $Na_2O$.

For example, a sodium alumino silicate pigment produced in the following manner is representative of those useful in the practice of this invention.

836 pounds of a kaolin clay is uniformly dispersed in 831 pounds of water containing 2.1 pounds of tetrasodium pyrophosphate as a dispersing agent.

This dispersion is charged into a lead-lined reaction vessel and 928 pounds of commercial 66° Baumé sulfuric acid containing 93.1% by weight $H_2SO_4$ is added thereto. During addition, the acid is intimately mixed with the clay dispersion and the reaction vessel is brought to and maintained at 100 pounds per square inch gauge and 338° F. for 3 hours while continuing the mixing. The clay-acid reaction slurry is then cooled and diluted with water to a final volume of 685 gallons.

A separate aqueous solution of sodium silicate is prepared containing 2490 pounds $Na_2O \cdot 2.5\ SiO_2$ in a total solution volume of 1245 gallons.

930 gallons of 10% by weight sodium sulfate solution is introduced into a 6000-gallon reaction vessel and agitated. The sodium silicate solution is added to the sodium sulfate solution while the agitation is continued. The silicate solution is introduced into the reaction vessel at the center parallel to the agitator shaft and a few minutes later the addition of the clay-acid reaction slurry is started. The clay-acid reaction slurry is added at the outside periphery of the reaction mass at a rate which maintains an alkaline pH in the reaction vessel during the silicate addition interval.

After all the silicate solution is added, the clay-acid reaction slurry addition is continued to lower the pH of the reaction mass within the alkaline range. After the clay-acid reaction slurry addition is completed, the reaction slurry is digested with agitation. A reaction mass temperature of 140–160° F. is maintained throughout the precipitation and digestion periods. After digestion, the pH is readjusted to slightly basic. The reaction slurry is filtered, washed and 3550 pounds of fine sodium alumino silicate pigment is recovered.

The resulting filter cake was converted to a pasty consistency by stirring and fed to a spray nozzle where it was atomized and contacted with a current of hot gases which dried the pigment in the form of porous, difficultly friable pellets having a particle size distribution of about 40% finer than 200 mesh and 25% finer than 325 mesh.

These pellets are unusual in that unlike other spray dried pellets which are hollow, they contain an inner reinforcing structure which prevents the pellets from breaking down under the usual shear produced in a paper pulp slurry. In order to break down these pellets to a fine powder, it is necessary to run them through a mill.

It is this property of unusual pellet strength which is taken advantage of in utilizing these pigment pellets for loading paper to produce the desired uniformly pebble-surfaced, abrasive, sorbent papers.

The paper is prepared from any of those pulps conventionally used for sheeted paper such as chemically treated pulps like sulfite, soda or kraft pulp; semi-chemical pulp; mechanically ground pulp; or mixtures of any of these may make up the pulp component. Not only bleached but unbleached pulps are useful. The cellulosic pulp component can be virgin pulp or broke or mixtures of the two.

The pigment pellets are uniformly dispersed throughout the sheet which accounts for the lack of two sidedness of the sheets making the felt and wire sides substantially indistinguishable to the touch.

The pigment pellets are incorporated into the slurry in an amount from 0.1 to 25 parts of pigment per 100 parts of pulp on a basis of dry pulp.

The pigment pellets are well retained in the sheeted product. At least 70% and in many cases over 95% of the pigment incorporated into the pulp slurry is retained in the sheeted product.

The resulting sheets have an ash content varying from about 6% to 10% and weigh about 60 to 80 pounds per ream, 24 x 36—500 basis, depending on the abrasiveness and pigment loading desired.

The following examples are not intended to limit the invention, but are illustrative only.

*Example I*

Bleached sulfite pulp was prepared by beating in a laboratory beater to a Canadian Standard Freeness of 360M. 100 parts of sulfite fiber (dry basis) and 15 parts of an alkaline sodium alumino silicate pigment (Zeolex® 23) in pellet form (dry basis) were dispersed in water to a consistency of about 0.2%. This pulp slurry was sheeted in a laboratory sheet mould. The finished sheets had a 7.96% ash content and weighed about 70 pounds per ream, 24 x 36—500 basis. The sheets were of a pebble-grained texture and showed no two sidedness. Zeolex 23, made in accordance with the disclosures of U.S. Patents 2,739,073 and 2,848,346, has the following analysis: 67–71% $SiO_2$; 11–12% $Al_2O_3$; 5.5–6.5% $Na_2O$; and 7.5–9.0% water of hydration. In a 20% aqueous slurry it has a pH of 9.5–10.5.

*Example II*

The procedure of Example I was followed, using 15 parts of Zeolex® 23 in milled or powder form in place of the pelleted form. The finished sheets had a 4.29% ash content and weighed about 60 pounds per ream, 24 x 36—500 basis. The surfaces of the sheets were normally smooth and showed a definite two sidedness.

*Example III*

The procedure of Example I was followed using as the filler 15 parts of a more neutral sodium alumino silicate pigment (Zeolex® 80) in pellet form. The resulting paper has an 8.67% ash content and weighed about 70 pounds per ream, 24 x 36—500 basis. The sheets were of a pebble-grained surface and showed no two sidedness. Zeolex 80, made in accordance with U.S. Patents 2,739,073 and 2,848,346 as well as copending applications Serial Nos. 107,090 and 112,230, has the following analysis: 66–70% $SiO_2$; 10–13% $Al_2O_3$; 5–6% $Na_2O$; and 10–11% water of hydration. In a 20% aqueous slurry it has a pH of 6.5–7.5.

*Example IV*

The procedure of Example I was followed using as the filler 15 parts of Zeolex® 80 in milled or powder form. The resulting paper had an ash content of 3.74% and weighed about 60 pounds per ream, 24 x 36—500 basis. The surfaces of the sheets were normally smooth and showed a definite two sidedness.

*Example V*

The procedure of Example I was followed using as the filler 15 parts of a filler grade kaolin clay. The resulting paper had an ash content of 3.83% and weighed about 50 pounds per ream, 24 x 36—500 basis. The surfaces of the sheets were normally smooth and showed a definite two sidedness.

While the above examples show a loading of about 15 parts of pigment, dry basis, for each 100 parts pulp fiber, dry basis, the invention is not intended to be limited to this specific pigment loading.

If the procedure of Example I is followed by using pigment loadings of 0.1, 1, 2, 4, 6, 8, 10, 20 or 25 parts dry weight of pigment per 100 parts dry weight of pulp fiber, similar results are achieved. The sheets differ only in the degree of abrasiveness and the ash content. To increase the abrasiveness of the sheets and increase their ash content it is necessary to increase the pigment loading. For example, a pigment loading of 25 parts per 100 results in a sheet of much greater abrasiveness than a pigment loading of 2 parts per 100.

In every case, however, no matter what the pigment loading is the resulting sheets do not exhibit any two sidedness.

The pebble grained surface of the paper was examined under the microscope and was revealed to consist of pigment agglomerates bound into the paper by individual fibers.

The protection afforded the pigment agglomerates by the fibers of the paper are a factor in maintaining the abrasive surface of the paper despite repeated use.

The reason the paper does not have two sidedness is because the pigment agglomerates are well dispersed and trapped uniformly throughout the paper by the fibers.

They are not sucked through and don't settle out in layers depending on the size of the pellets, because of this entrapment.

The foregoing is illustrative only and additional modifications may be made without departing from the substance of the invention as defined in the appended claims.

We claim:

1. Sorptive, abrasive, pebble-surfaced paper having dispersed therein a siliceous pigment in the form of difficultly friable spray dried pellets containing an inner reinforcing structure.

2. Sorptive, abrasive, pebble-surfaced paper having dispersed therein a sodium alumino silicate pigment in the form of difficultly friable spray dried pellets containing an inner reinforcing structure.

3. Sorptive, abrasive, pebble-surfaced paper having dispersed therein a sodium alumino silicate pigment in the form of difficultly friable spray dried pellets containing an inner reinforcing structure, said pigment having a pellet size distribution of about 5 to 30% finer than 325 mesh.

4. Sorptive, abrasive, pebble-surfaced paper having dispersed therein a sodium alumino silicate pigment in the form of difficultly friable spray dried pellets containing an inner reinforcing structure, said pigment having a pellet size distribution of about 5 to 30% finer than 325 mesh and containing about at least 0.75 mole of $Na_2O$ per mole of $Al_2O_3$ and over 4 moles of $SiO_2$ per mole of $Na_2O$ and having a specific gravity of 2.10 to 2.26.

5. Sorptive, abrasive, pebble-surfaced paper having dispersed therein a sodium alumino silicate pigment in the form of difficultly friable spray dried pellets containing an inner reinforcing structure, said pigment having a pellet size distribution of about 5 to 30% finer than 325 mesh and containing about 0.75 to 1.3 moles of $Na_2O$ per mole of $Al_2O_3$ and about 4 to 22 moles of $SiO_2$ per mole of $Na_2O$ and having a specific gravity of 2.10 to 2.26.

6. The paper of claim 1, wherein the pigment loading is from 0.1 to 25 parts pigment, dry basis, for every 100 parts paper pulp, dry basis.

7. The paper of claim 2, wherein the pigment loading is from 0.1 to 25 parts pigment, dry basis, for every 100 parts paper pulp, dry basis.

8. The paper of claim 3, wherein the pigment loading is from 0.1 to 25 parts pigments, dry basis, for every 100 parts paper pulp, dry basis.

9. The paper of claim 4, wherein the pigment loading is from 0.1 to 25 parts pigment, dry basis, for every 100 parts paper pulp, dry basis.

10. The paper of claim 5, wherein the pigment loading is from 0.1 to 25 parts pigment, dry basis, for every 100 parts paper pulp, dry basis.

11. Sorptive, abrasive, pebble-surfaced paper having dispersed therein 15 parts, dry weight, of a sodium alumino silicate pigment per 100 parts of pulp fiber, dry weight, said pigment being in the form of difficultly friable spray dried pellets containing an inner reinforcing structure having a pellet size distribution of about 5 to 30% finer than 325 mesh and containing about 0.75 to 1.3 moles of $Na_2O$ per mole of $Al_2O_3$ and about 4 to 22 moles of $SiO_2$ per mole of $Al_2O_3$ and having a specific gravity of 2.10 to 2.26.

12. The process of making sorptive, abrasive, pebble-surfaced paper which comprises forming paper from a pulp slurry containing 0.1 to 25 parts siliceous pigment, dry weight, per 100 parts pulp fiber, dry weight, said pigment being in the form of difficultly friable spray dried pellets containing an inner reinforcing structure.

13. The process according to claim 12, wherein said pigment is a sodium alumino silicate.

14. The process according to claim 13, wherein the sodium alumino silicate pigment contains above about 0.75 mole of $Na_2O$ per mole of $Al_2O_3$ and over about 4 moles of $SiO_2$ per mole of $Na_2O$ and has a specific gravity of 2.10 to 2.26.

15. The process according to claim 14, wherein the size distribution of the pigment pellets is about 5 to 30% finer than 325 mesh.

16. The process according to claim 13, wherein the sodium alumino silicate pigment contains about 0.75 to 1.3 moles of $Na_2O$ per mole of $Al_2O_3$ and about 4 to 22 moles of $SiO_2$ per mole of $Na_2O$ and has a specific gravity of 2.10 to 2.26.

17. The process of making a sorptive, abrasive, pebble-surfaced paper which comprises forming paper from a pulp slurry containing 15 parts, dry basis, of a sodium alumino silicate pigment in spray dried form for every 100 parts, dry basis, of pulp fiber, said pigment containing about 0.75 to 1.3 moles of $Na_2O$ per mole of $Al_2O_3$ and about 4 to 22 moles of $SiO_2$ per mole of $Na_2O$ and specific gravity of 2.10 to 2.26 and having a pellet size distribution of about 5 to 30% in the 325 mesh range, the pellets being difficultly friable and containing an inner reinforcing structure.

18. The process of claim 17, wherein the pulp fiber is composed of sulfite fiber.

19. The process of claim 17, wherein the pulp fiber is composed of kraft fiber.

20. The process of claim 17, wherein the pulp fiber is composed of bleached sulfite fibers.

References Cited in the file of this patent

UNITED STATES PATENTS

| | | |
|---|---|---|
| 2,468,853 | Williamson | May 3, 1949 |
| 2,682,460 | Carper | June 29, 1954 |
| 2,918,399 | Eichmeier | Dec. 22, 1959 |
| 2,950,983 | Rowland | Aug. 30, 1960 |

OTHER REFERENCES

Quinn: "Spray Drying Pigments," "American Ink Maker," 1959, pages 30, 31, 57, 59.